United States Patent
Tsai et al.

(10) Patent No.: US 10,511,753 B2
(45) Date of Patent: Dec. 17, 2019

(54) IMAGE CAPTURING DEVICE

(71) Applicant: Wistron NeWeb Corp., Hsinchu (TW)

(72) Inventors: Yung-Ping Tsai, Hsinchu (TW); Ting-Hsuan Chen, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 41 days.

(21) Appl. No.: 16/016,047

(22) Filed: Jun. 22, 2018

(65) Prior Publication Data
US 2019/0124236 A1 Apr. 25, 2019

(30) Foreign Application Priority Data
Oct. 19, 2017 (TW) .............................. 106135933 A

(51) Int. Cl.
*H04N 5/225* (2006.01)

(52) U.S. Cl.
CPC ......... *H04N 5/2253* (2013.01); *H04N 5/2252* (2013.01); *H04N 5/2254* (2013.01)

(58) Field of Classification Search
CPC ... H04N 5/2253; H04N 5/2252; H04N 5/2254
See application file for complete search history.

(56) References Cited

U.S. PATENT DOCUMENTS

| 9,157,613 | B2 | 10/2015 | Tsai et al. | |
| 10,419,654 | B2 * | 9/2019 | Park | H04N 5/2253 |
| 2008/0093721 | A1 | 4/2008 | Kang et al. | |
| 2012/0044412 | A1 | 2/2012 | Lo | |
| 2014/0320657 | A1 * | 10/2014 | Han | B60R 11/04 348/148 |
| 2014/0362286 | A1 * | 12/2014 | Komi | G06K 7/10732 348/374 |
| 2017/0195584 | A1 * | 7/2017 | Kostrzewa | H04N 5/33 |
| 2019/0170920 | A1 * | 6/2019 | Park | G02B 5/283 |
| 2019/0222726 | A1 * | 7/2019 | Pan | F16M 11/123 |

FOREIGN PATENT DOCUMENTS

| TW | 201210327 A1 | 3/2012 |
| TW | M457898 U1 | 7/2013 |
| TW | 201433245 A | 8/2014 |

* cited by examiner

*Primary Examiner* — Timothy J Henn
(74) *Attorney, Agent, or Firm* — McClure, Qualey & Rodack, LLP

(57) ABSTRACT

An image capturing device is provided. The image capturing device includes a housing, a first circuit board, a second circuit board, a supporting frame and a lens. The first circuit board is disposed in the housing, wherein the first circuit board includes an image sensing unit. The second circuit board is disposed in the housing and coupled to the first circuit board. The supporting frame is disposed in the housing, wherein at least a portion of the supporting frame surrounds the first circuit board and the second circuit board, the first circuit board and the second circuit board abut the supporting frame, the supporting frame includes at least one spacer formed thereon, the spacer is sandwiched between the first circuit board and the second circuit board. The lens is connected to the housing and corresponds to the image sensing unit.

20 Claims, 12 Drawing Sheets

IMAGE CAPTURING DEVICE

CROSS REFERENCE TO RELATED APPLICATIONS

This Application claims priority of Taiwan Patent Application No. 106135933, filed on Oct. 19, 2017, the entirety of which is incorporated by reference herein.

BACKGROUND OF THE INVENTION

Field of the Invention

The present invention relates to an image capturing device, and in particular to an image capturing device increasing the available space of the circuit board therein.

Description of the Related Art

Image capturing devices are popularly utilized on cars. The size of such image capturing devices has gradually decreased. The waterproof ability and pixel requirements of image capturing devices have gradually increased. A conventional high-definition image capturing device includes a plurality of circuit boards. The circuit boards are affixed to the housing or the holder by screws. The SMT nuts are disposed between the circuit boards to keep a distance between the circuit boards. However, the openings for the screws and the SMT nuts occupy additional space on the circuit boards. The size of the image capturing devices therefore cannot be miniaturized further, and the cost of material and of assembly increase.

BRIEF SUMMARY OF THE INVENTION

In one embodiment, an image capturing device is provided. The image capturing device includes a housing, a first circuit board, a second circuit board, a supporting frame and a lens. The first circuit board is disposed in the housing, wherein the first circuit board includes an image sensing unit. The second circuit board is disposed in the housing and coupled to the first circuit board. The supporting frame is disposed in the housing, wherein at least a portion of the supporting frame surrounds the first circuit board and the second circuit board, the first circuit board and the second circuit board abut the supporting frame, the supporting frame includes at least one spacer formed thereon, the spacer is sandwiched between the first circuit board and the second circuit board to keep a distance between the first circuit board and the second circuit board. The lens is connected to the housing and corresponds to the image sensing unit.

Utilizing the image capturing device of the embodiment of the invention, the spacer replaces the conventional SMT nuts to maintain the distance between the first circuit board and the second circuit board. Additionally, the abutting portions (the first abutting portions and the second abutting portions) and the spacers hold the first circuit board and the second circuit board, and the conventional bolts are omitted. The available space on the first circuit board and the second circuit board is increased. The size of the image capturing device is decreased, and the material cost and the assembling cost are reduced. Additionally, the supporting frame has sufficient strength to resist the impacts from different directions, and the reliability of the image capturing device is thereby improved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
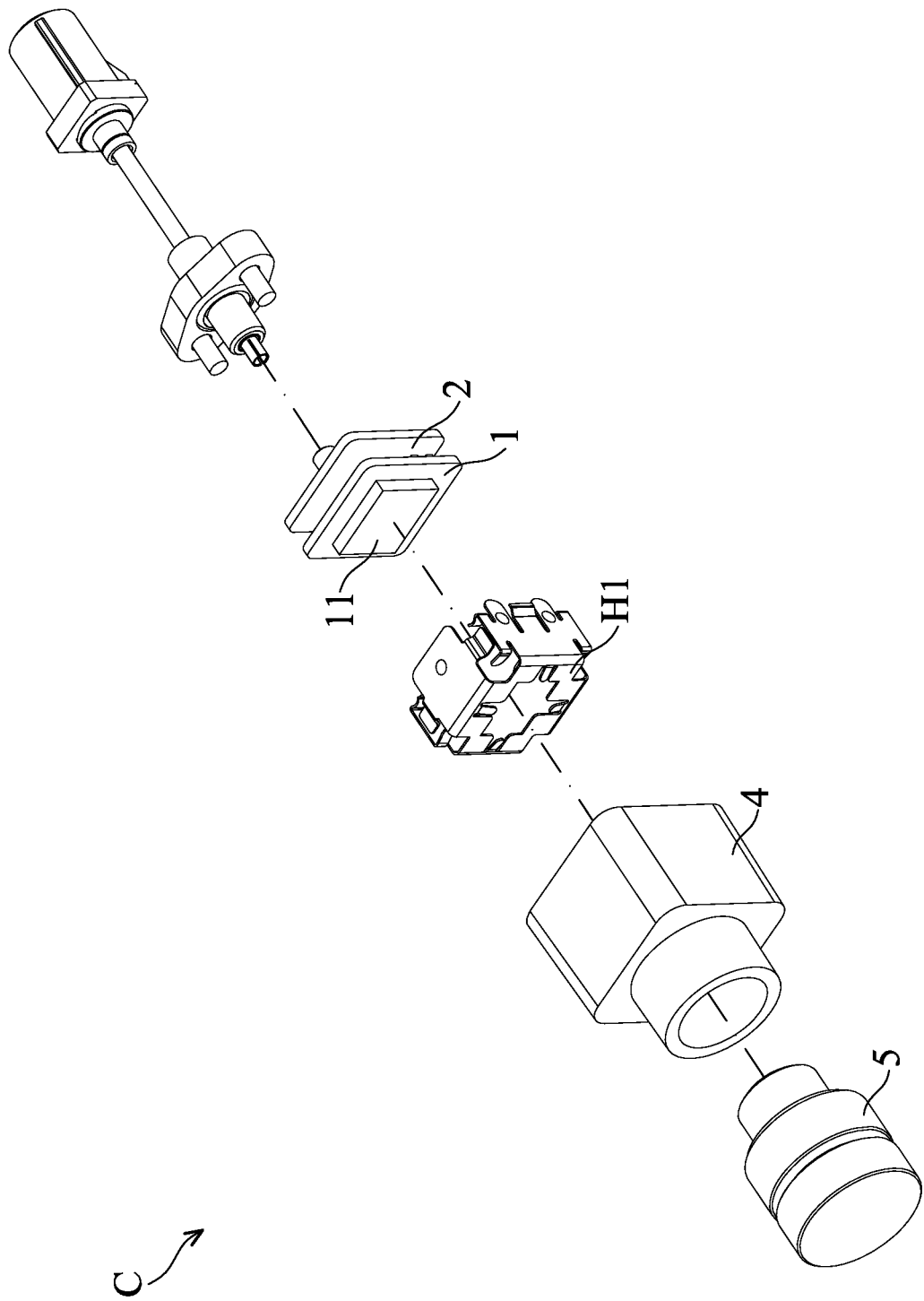
FIG. 1A is an exploded view of the image capturing device of the first embodiment of the invention.
Figure 1B:
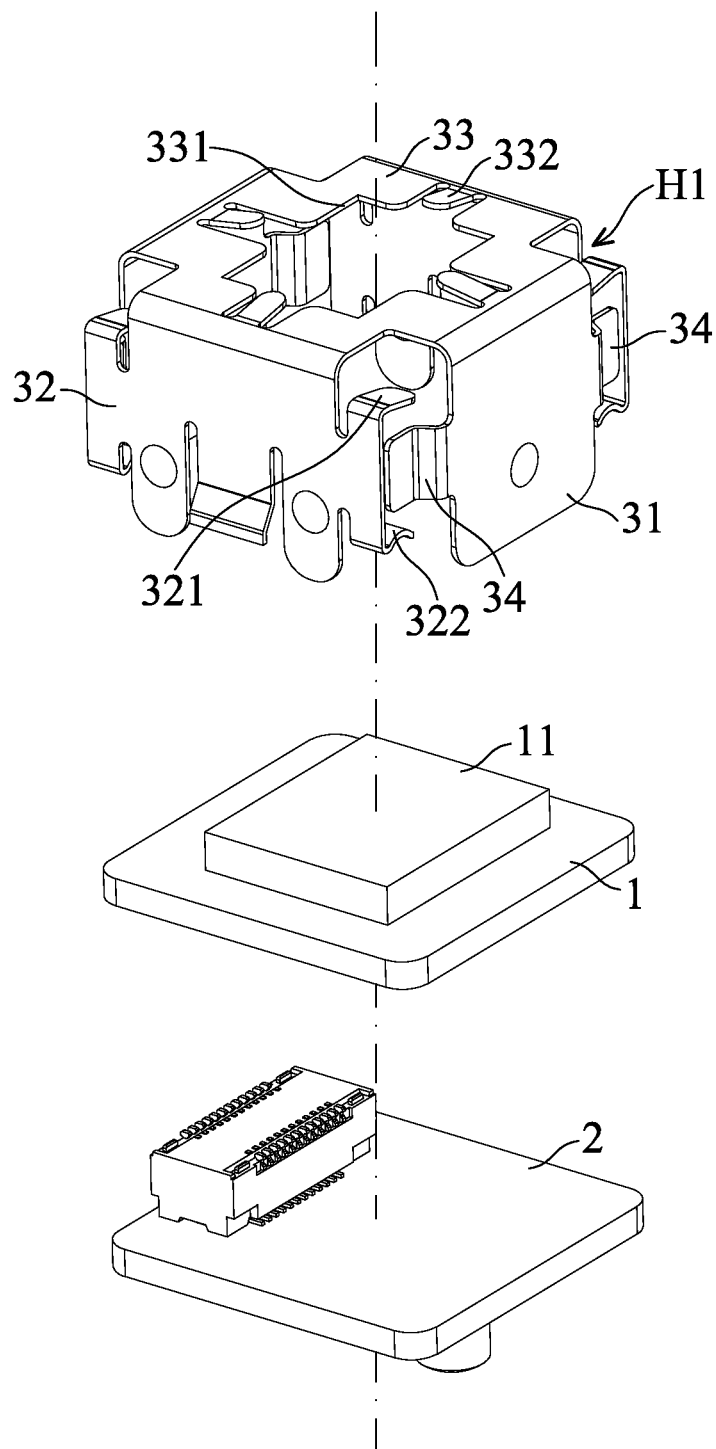
FIG. 1B is an exploded view of the supporting frame, the first circuit board and the second circuit board of the first embodiment of the invention.

FIGS. 1A and 1B show an image capturing device C of a first embodiment of the invention. The image capturing device C includes a housing 4, a first circuit board 1, a second circuit board 2, a supporting frame H1 and a lens 5. The first circuit board 1 is disposed in the housing 4. The first circuit board 1 comprises an image sensing unit 11. The second circuit board 2 is disposed in the housing 4 and coupled to the first circuit board 1. The supporting frame H1 is disposed in the housing 4. At least a portion of the supporting frame H1 surrounds the first circuit board 1 and the second circuit board 2. The first circuit board 1 and the second circuit board 2 abut the supporting frame H1. The supporting frame H1 comprises at least one spacer 34. The spacer 34 is formed on the supporting frame H1. The spacer 34 is sandwiched between the first circuit board 1 and the second circuit board 2 to keep a distance between the first circuit board 1 and the second circuit board 2. The lens 5 is connected to the housing 4 and corresponds to the image sensing unit 11.

Figure 2A:
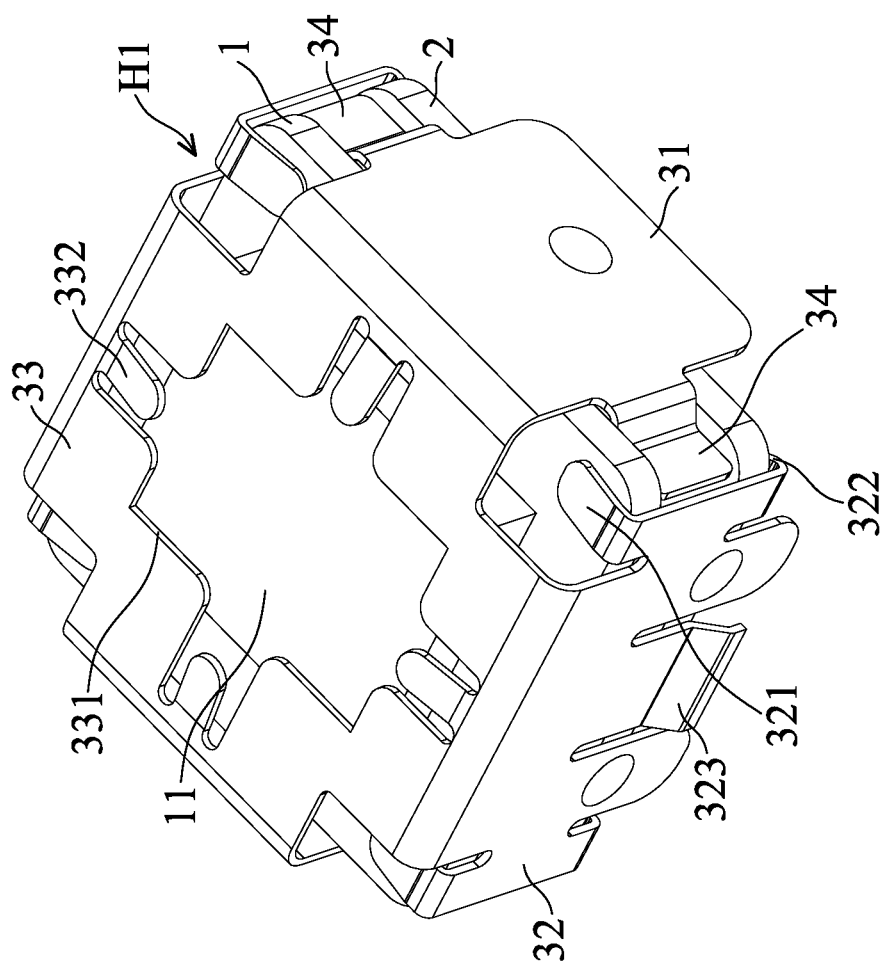
FIG. 2A is a perspective view of the supporting frame, the first circuit board and the second circuit board of the first embodiment of the invention.
Figure 2B:
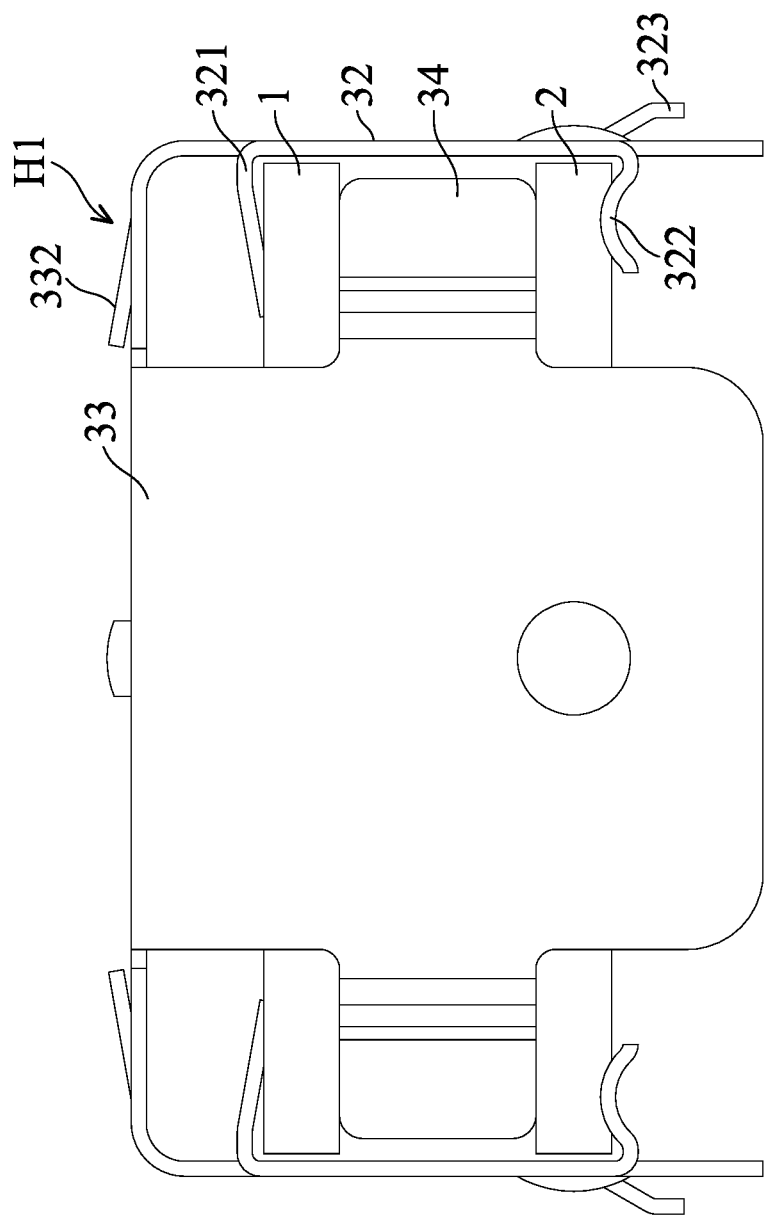
FIG. 2B is a side view of the supporting frame, the first circuit board and the second circuit board of the first embodiment of the invention.

With reference to FIG. 1B, in one embodiment, the supporting frame H1 is a sheet metal member. The spacer 34 is integrally formed on the supporting frame H1. With reference to FIGS. 2A and 2B, in one embodiment, the supporting frame H1 comprises a base 33, two first lateral plates 31 and two second lateral plates 32. The base 33 comprises an opening 331. The opening 331 corresponds to the image sensing unit 11. The first lateral plates 31 are connected to the base 33, wherein the first lateral plates 31 face each other, and the spacers 34 are formed on the first lateral plate 31. The second lateral plates 32 are connected to the base 33. The second lateral plates 32 face each other. The first lateral plates 31 and the second lateral plates 32 surround the first circuit board 1 and the second circuit board 2.

With reference to FIGS. 2A and 2B, in this embodiment, each first lateral plate 31 comprises the two spacers 34, and the two spacers 34 are formed on two sides of the first lateral plate 31. The spacers 34 formed on the first lateral plate 31 are bent toward the other first lateral plate 31.

With reference to FIGS. 2A and 2B, in this embodiment, each second lateral plate 32 comprises a plurality of first abutting portions 321, and the first circuit board 1 is sandwiched between the first abutting portions 321 and the spacers 34. The first abutting portions 321 are bent in an extending direction perpendicular to the two sides of the second lateral plate 32. Each second lateral plate 32 comprises a plurality of second abutting portions 322, and the second circuit board 2 is sandwiched between the second abutting portions 322 and the spacers 34. The second abutting portions 322 are bent in an extending direction perpendicular to the two sides of the second lateral plate 32. The first abutting portion 321 faces the second abutting portion 322. The spacer 34 is located between the first abutting portion 321 and the second abutting portion 322.

Utilizing the image capturing device of the embodiment of the invention, the spacer replaces the conventional SMT nuts to maintain the distance between the first circuit board and the second circuit board. Additionally, the abutting portions (the first abutting portions and the second abutting portions) and the spacers hold the first circuit board and the second circuit board, and the conventional bolts are omitted. The available space on the first circuit board and the second circuit board is increased. The size of the image capturing device is decreased, and the material cost and the assembling cost are reduced. Additionally, the supporting frame has sufficient strength to resist the impacts from different directions, and the reliability of the image capturing device is thereby improved.

In the embodiment above, the shape and the position of the first abutting portions, the second abutting portions and the spacers can be modified, and the disclosure is not meant to restrict the invention.

Figure 3A:
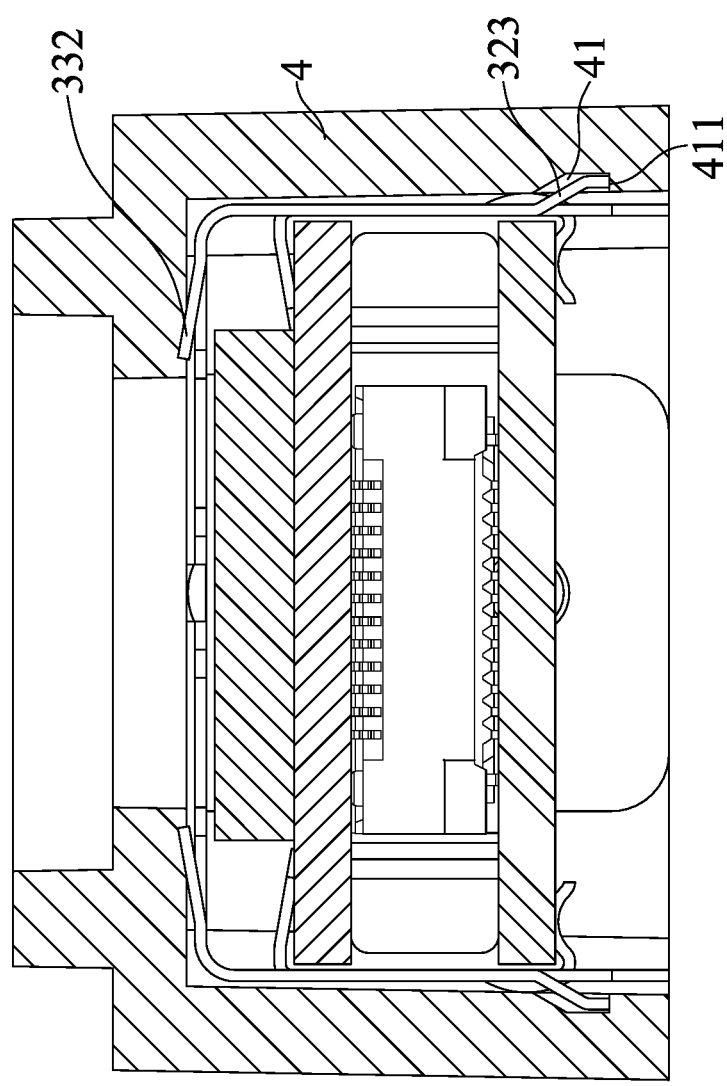
FIG. 3A is a sectional view of the main elements of the first embodiment of the invention.

With reference to FIGS. 2A and 3A, in one embodiment, the base 33 further comprises a plurality of buffer portions 332. The buffer portions 332 extend from the base 33 toward the housing 4, and a free end of each buffer portion 332 abuts the housing 4. The buffer portions 332 compensate for manufacturing tolerance and keep the distance between the lens 5 and the image sensing unit 11.

Figure 3B:
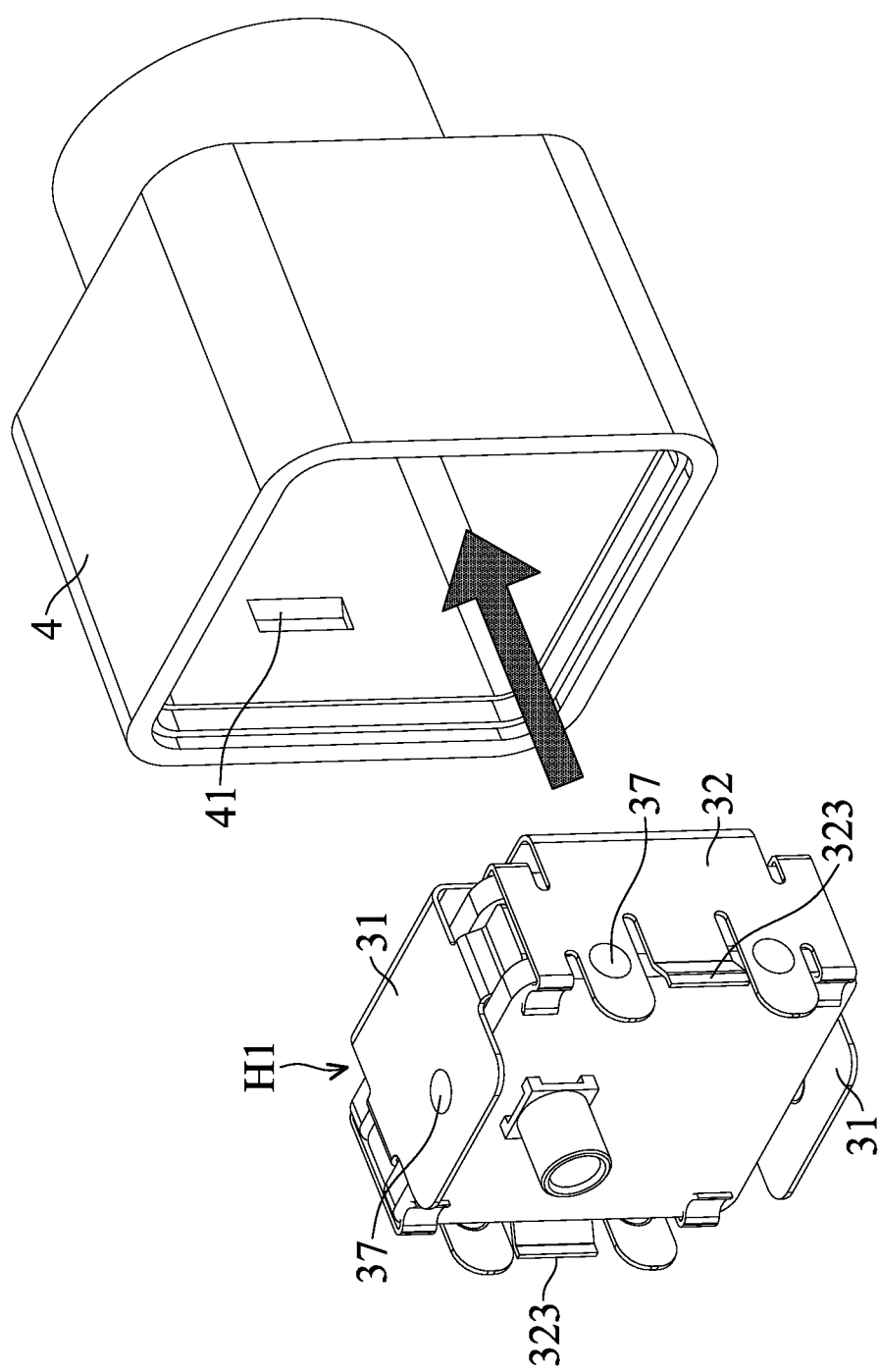
FIG. 3B shows the supporting frame combining the housing of the first embodiment of the invention.

With reference to FIGS. 3A and 3B, in one embodiment, each second lateral plate 32 comprises a hook 323. Each hook 323 comprises a free end extending toward the housing 4. The housing 4 comprises a plurality of recesses 41 formed on an inner wall of the housing 4. Each recess 41 comprises a bottom surface 411. The free ends of the hooks 323 wedge the bottom surface 411 of the recess 41. Similarly, the hooks 323 compensate for manufacturing tolerance, and the housing 4 therefore can be firmly connected to the supporting frame H1.

With reference to FIG. 3A, in one embodiment, the supporting frame H1 comprises a plurality of positioning protrusions 37, and the positioning protrusions 37 abut an inner wall of the housing 4. Similarly, the positioning protrusions 37 compensate for manufacturing tolerance, and the housing 4 therefore can be firmly connected to the supporting frame H1.

Figure 4A:
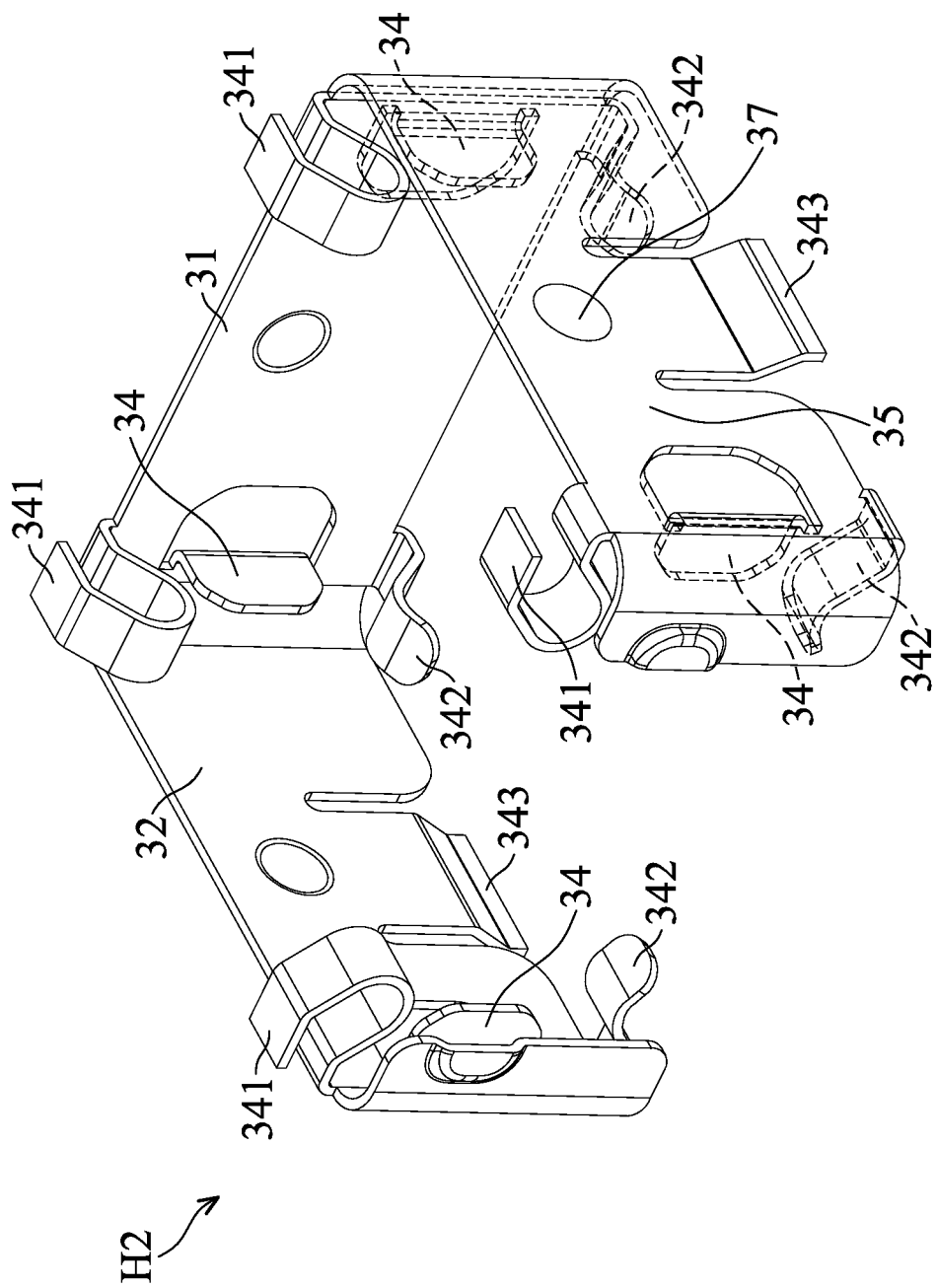
FIG. 4A shows the supporting frame of the second embodiment of the invention.

FIG. 4A shows a supporting frame H2 of a second embodiment of the invention. In this embodiment, the supporting frame H2 is a sheet metal member. The supporting frame H2 comprises a first lateral plate 31, a second lateral plate 32 and a third lateral plate 35. The second lateral plate 32 is connected to a side of the first lateral plate 31. The third lateral plate 35 connected to another side of the first lateral plate 31. The second lateral plate 32 is parallel to the third lateral plate 35. The spacers 34 are formed on the first lateral plate 31, the second lateral plate 32 and the third lateral plate 35.

In the embodiments above, the spacers 34 are formed on the first lateral plate 31, the second lateral plate 32 and the third lateral plate 35. However, the disclosure is not meant to restrict the invention. In another embodiment, the spacers 34 can only be formed on the second lateral plate 32 and the third lateral plate 35. The numbers of the spacers 34 can also be modified.

Figure 4B:
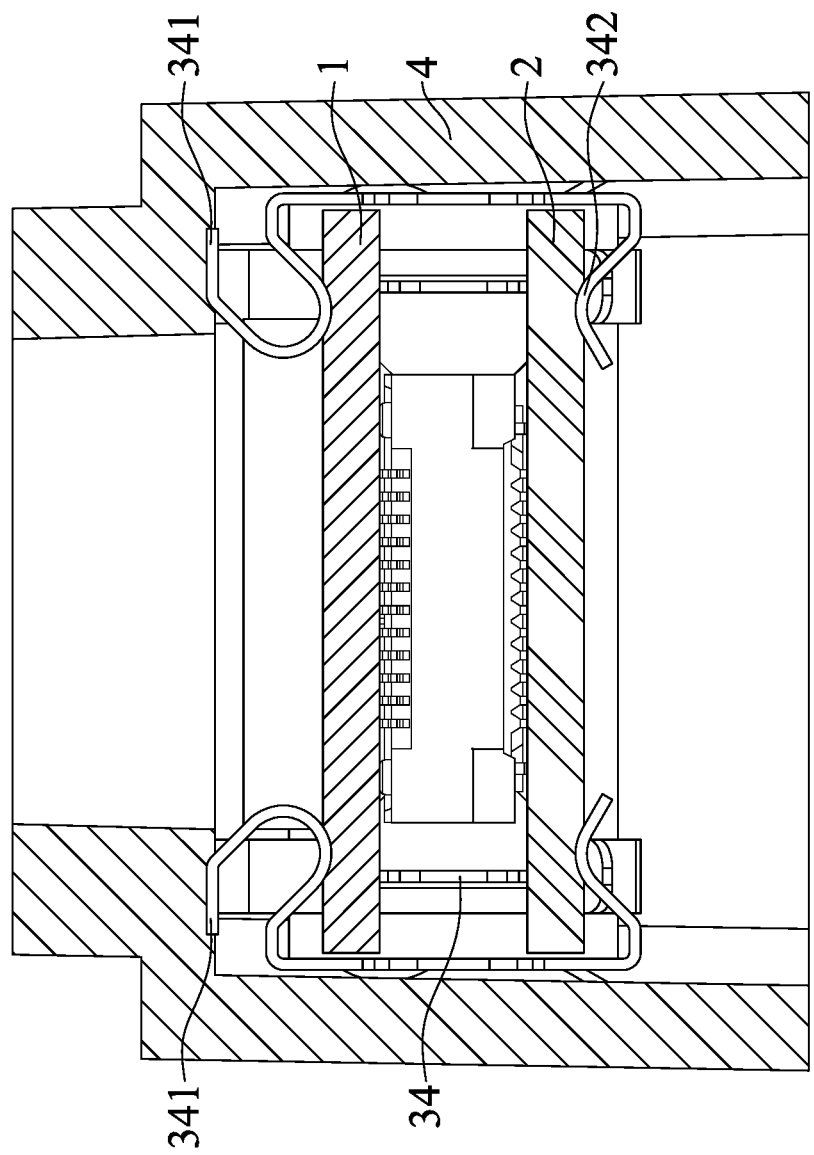
FIG. 4B is a sectional view of the main elements of the second embodiment of the invention, wherein the first abutting portion, the second abutting portion and the spacer hold the first circuit board and the second circuit board.

With reference to FIGS. 4A and 4B, in this embodiment, the supporting frame H2 further comprises a plurality of first abutting portions 341. The first abutting portions 341 are formed on the first lateral plate 31, the second lateral plate 32 and the third lateral plate 35. Each first abutting portion 341 abuts the first circuit board 1 and the housing 4 at the same time. The first circuit board 1 is sandwiched between the first abutting portions 341 and the spacers 34. The first abutting portions 341 abut the first circuit board 1 and the housing 4 at the same time to compensate variable manufacturing tolerances, and to keep the distance between the lens 5 and the image sensing unit 11. In one embodiment, the free ends of the first abutting portions 341 can be welded to the housing 4.

In the embodiments above, the first abutting portions 341 are formed on the first lateral plate 31, the second lateral plate 32 and the third lateral plate 35. However, the disclosure is not meant to restrict the invention. In another embodiment, the first abutting portions 341 can only be formed on the second lateral plate 32 and the third lateral plate 35. The numbers of the first abutting portions 341 can also be varied.

With reference to FIGS. 4A and 4B, in one embodiment, the supporting frame H2 further comprises a plurality of second abutting portions 342. The second abutting portions 342 are formed on the first lateral plate 31, the second lateral plate 32 and the third lateral plate 35. The second abutting portions 342 abut the second circuit board 2, and the second circuit board 2 is sandwiched between the second abutting portions 342 and the spacers 34.

In the embodiments above, the second abutting portions 342 are formed on the first lateral plate 31, the second lateral plate 32 and the third lateral plate 35. However, the disclosure is not meant to restrict the invention. In another embodiment, the second abutting portions 342 can only be formed on the second lateral plate 32 and the third lateral plate 35. The numbers of the second abutting portions 342 can also be modified.

Figure 4C:
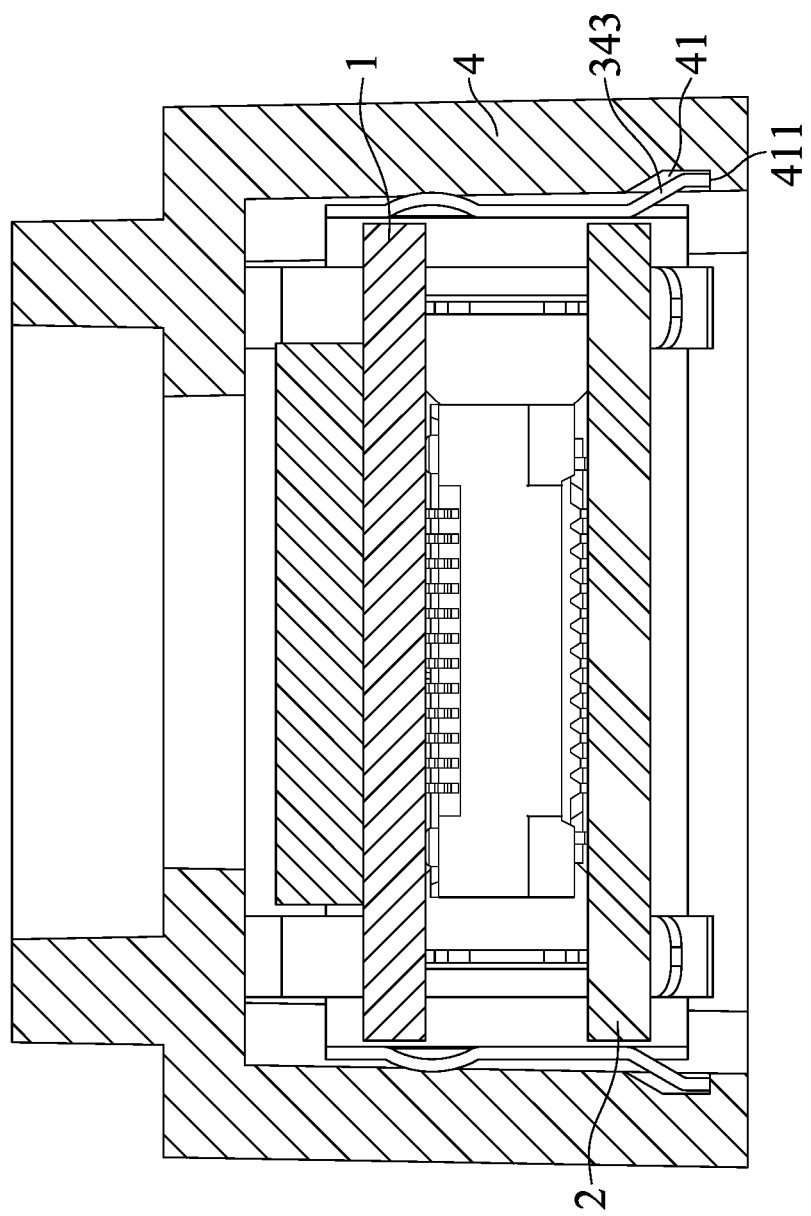
FIG. 4C is a sectional view of the main elements of the second embodiment of the invention, wherein the hook wedges the recess.

With reference to FIG. 4C, similar to the first embodiment, in this embodiment, the supporting frame H2 comprises a plurality of hooks 343. Each hook 343 comprises a free end extending toward the housing 4. The hooks 343 are formed on the second lateral plate 32 and the third lateral plate 35. The housing 4 comprises a plurality of recesses 41 formed on an inner wall of the housing 4. Each recess 41 comprises a bottom surface 411, and the free ends of the hooks 343 wedge the bottom surface 411 of the recess 41. Similarly, the hooks 343 compensate for manufacturing tolerance, and the housing 4 therefore can be firmly connected to the supporting frame H2.

With reference to FIG. 4A, in one embodiment, the supporting frame H2 comprises a plurality of positioning protrusions 37, and the positioning protrusions 37 abut an inner wall of the housing 4. Similarly, the positioning protrusions 37 compensate for manufacturing tolerance, and the housing 4 therefore can be firmly connected to the supporting frame H2.

Figure 5A:
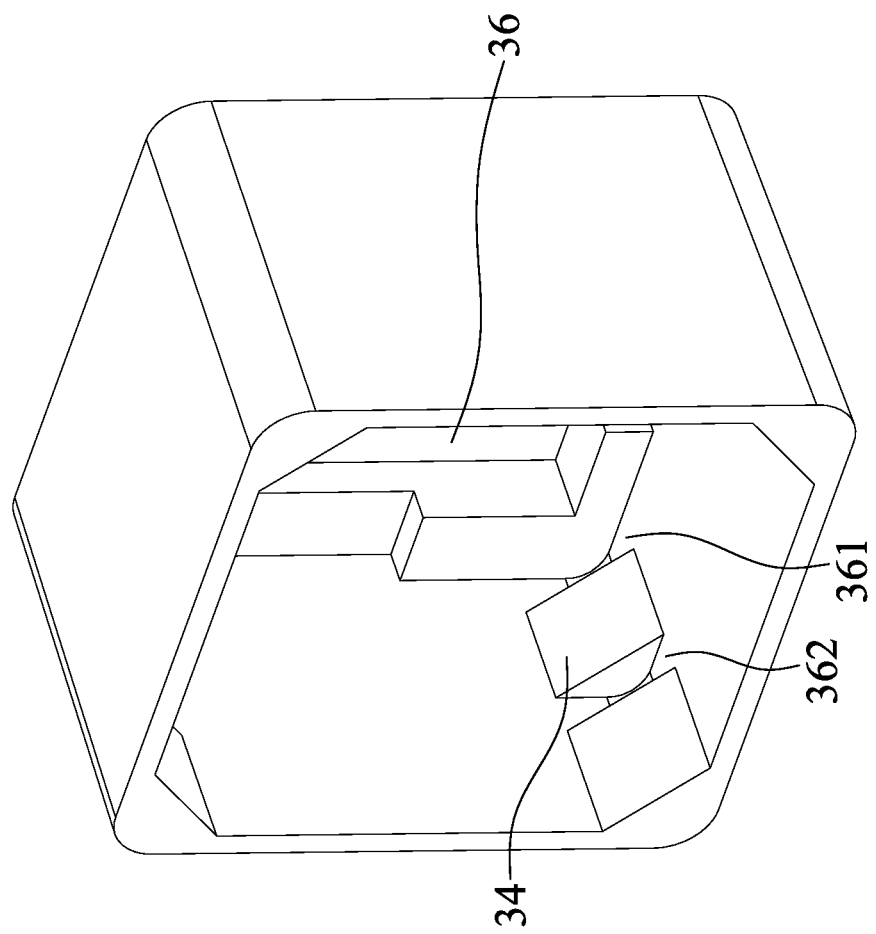
FIG. 5A shows the supporting frame of the third embodiment of the invention.
Figure 5B:
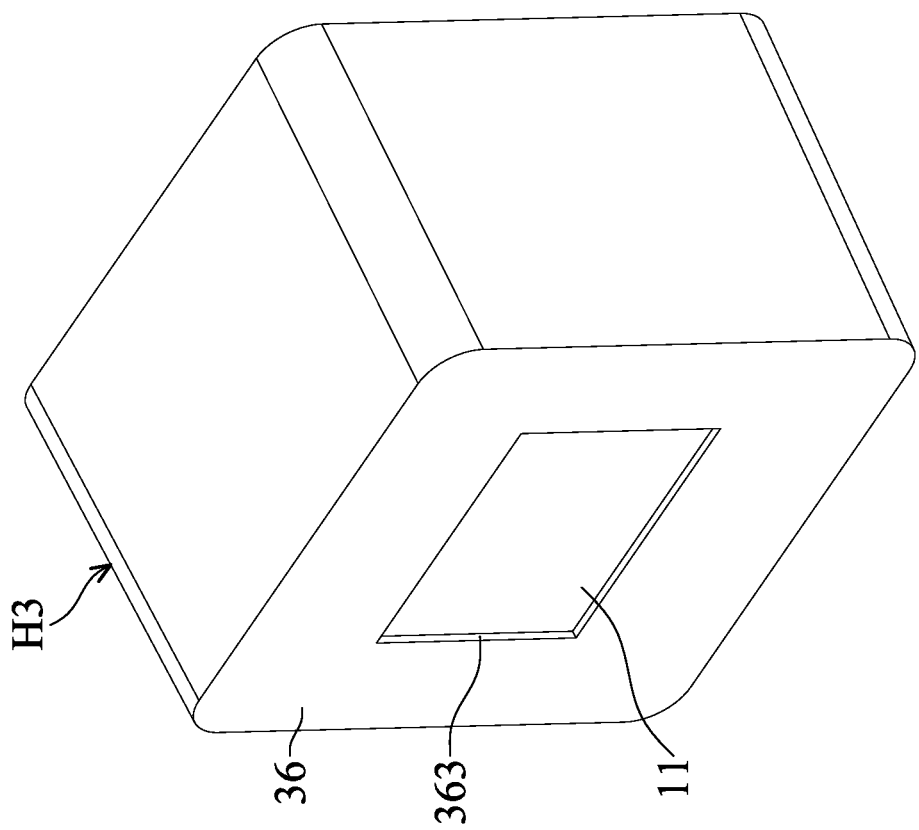
FIG. 5B shows the supporting frame of the third embodiment of the invention combining the first circuit board.
Figure 5C:
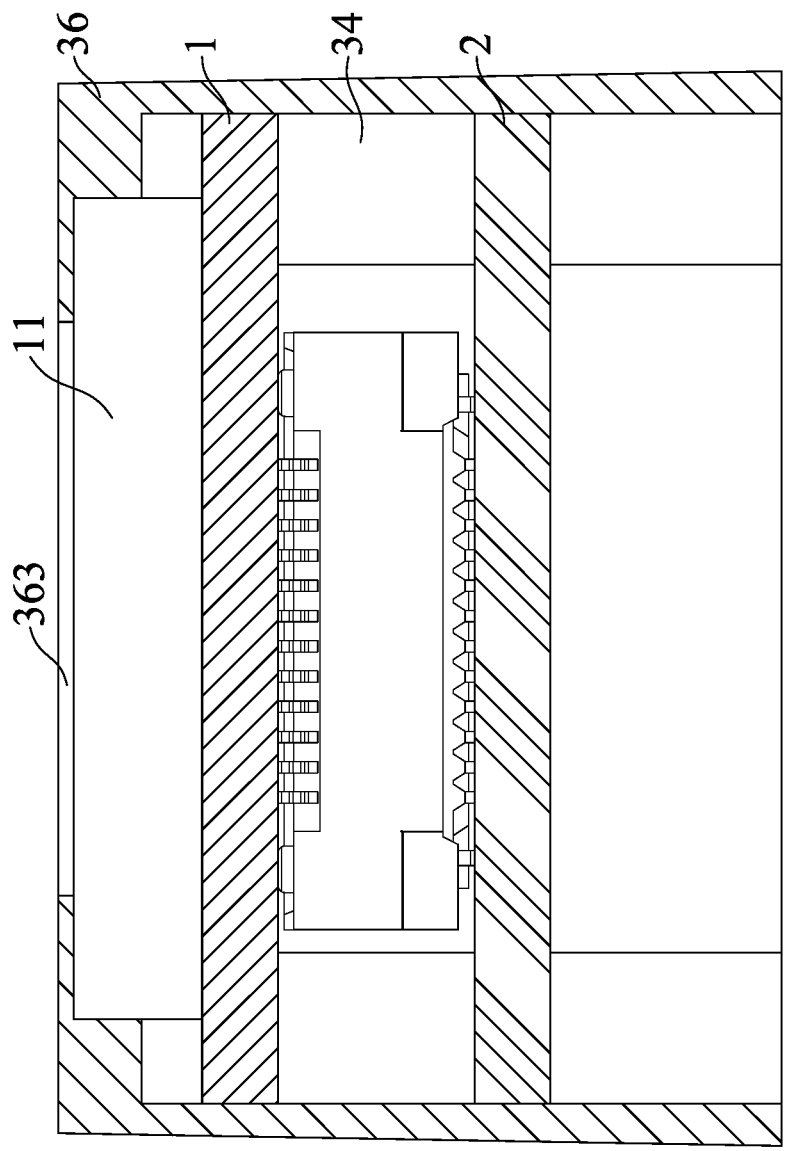
FIG. 5C is a sectional view of the main elements of the third embodiment of the invention.

FIGS. 5A, 5B and 5C show a supporting frame H3 of a third embodiment of the invention. With reference to FIGS. 5A, 5B and 5C, in this embodiment, the supporting frame H3 is an elastic member. The supporting frame H3 comprises a plurality of first restriction slots 361, a plurality of second restriction slots 362, and a base 36. Each first restriction slot 361 is formed on a side of the spacer 34. Each second restriction slot 362 is formed on another side of the spacer 34. The first circuit board 1 is embedded in the first restriction slot 361, and the second circuit board 2 is embedded in the second restriction recess 362. Therefore, the distance between the first circuit board and the second circuit board is maintained. The image sensing unit 11 is sandwiched between the base 36 and the first circuit board. The base 36 comprises an opening 363, and the opening 363 exposes at least a portion of the image sensing unit 11. The base 36 is adjacent to or abuts the image sensing unit 11 to reduce the flare caused by the reflection inside the housing 4, and to improve image quality.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capturing device, comprising:
    a housing;
    a first circuit board, disposed in the housing, wherein the first circuit board comprises an image sensing unit;
    a second circuit board, disposed in the housing and coupled to the first circuit board;
    a supporting frame, disposed in the housing, wherein at least a portion of the supporting frame surrounds the first circuit board and the second circuit board, the first circuit board and the second circuit board abut the supporting frame, the supporting frame comprises at least one spacer formed thereon, the spacer is sandwiched between the first circuit board and the second circuit board to keep a distance between the first circuit board and the second circuit board, wherein the supporting frame further comprises two first lateral plates, the first lateral plates face each other, the spacers are formed on the first lateral plates, and the first circuit board and the second circuit board are disposed between the first lateral plates; and
    a lens, connected to the housing and corresponding to the image sensing unit.

2. The image capturing device as claimed in claim 1, wherein the spacer is integrally formed on the supporting frame.

3. The image capturing device as claimed in claim 2, wherein the supporting frame is a sheet metal, and the supporting frame comprises:
    a base, comprising an opening, wherein the opening corresponds to the image sensing unit, wherein the first lateral plates are connected to the base;
    two second lateral plates, connected to the base, wherein the second lateral plates face each other, and the first lateral plates and the second lateral plates surround the first circuit board and the second circuit board.

4. The image capturing device as claimed in claim 3, wherein each first lateral plate comprises the two spacers, and the two spacers are formed on two opposite sides of the first lateral plate.

5. The image capturing device as claimed in claim 4, wherein the spacers formed on one of the two first lateral plates are bent toward the other first lateral plate.

6. The image capturing device as claimed in claim 3, wherein each second lateral plate comprises a plurality of first abutting portions, and the first circuit board is sandwiched between the first abutting portions and the spacers.

7. The image capturing device as claimed in claim 6, wherein each of the first abutting portions is bent inwardly in order to abut against the first circuit board.

8. The image capturing device as claimed in claim 6, wherein each second lateral plate comprises a plurality of second abutting portions, and the second circuit board is sandwiched between the second abutting portions and the spacers.

9. The image capturing device as claimed in claim 8, wherein each of the second abutting portions is bent inwardly in order to abut against the second circuit board, the first abutting portion faces the second abutting portion, and the spacer is located between the first abutting portion and the second abutting portion.

10. The image capturing device as claimed in claim 3, wherein the base further comprises a plurality of buffer portions, the buffer portions extend from the base toward the housing in a direction perpendicular to an imaging surface of the image sensing unit, and a free end of each buffer portion abuts the housing.

11. The image capturing device as claimed in claim 3, wherein each second lateral plate comprises a hook, each hook comprises a free end extending toward the housing, the housing comprises a plurality of recesses formed on an inner wall of the housing, each recess comprises a bottom surface, and the free ends of the hooks wedge the bottom surface of the recess.

12. The image capturing device as claimed in claim 1, wherein the supporting frame comprises a plurality of positioning protrusions, and the positioning protrusions abut an inner wall of the housing.

13. An image capturing device, comprising:
a housing;
a first circuit board, disposed in the housing, wherein the first circuit board comprises an image sensing unit;
a second circuit board, disposed in the housing and coupled to the first circuit board;
a supporting frame, disposed in the housing, wherein at least a portion of the supporting frame surrounds the first circuit board and the second circuit board, the first circuit board and the second circuit board abut the supporting frame, the supporting frame comprises at least one spacer formed thereon, the spacer is sandwiched between the first circuit board and the second circuit board to keep a distance between the first circuit board and the second circuit board, wherein the supporting frame is a sheet metal member, and the supporting frame comprises:
a first lateral plate;
a second lateral plate, connected to a side of the first lateral plate;
a third lateral plate, connected to another side of the first lateral plate opposite of the side thereof, wherein the second lateral plate is parallel to the third lateral plate, the spacers are formed on the second lateral plate and the third lateral plate, and the first circuit board and the second circuit board are disposed between the second lateral plate and the third lateral plate; and
a lens, connected to the housing, and corresponding to the image sensing unit.

14. The image capturing device as claimed in claim 13, wherein the spacers are formed on the first lateral plate, the second lateral plate, and the third lateral plate.

15. The image capturing device as claimed in claim 13, wherein the supporting frame further comprises a plurality of first abutting portions, the first abutting portions are formed on the second lateral plate and the third lateral plate, each first abutting portion abuts both the first circuit board and the housing, and the first circuit board is sandwiched between the first abutting portions and the spacers.

16. The image capturing device as claimed in claim 15, wherein the first abutting portions are formed on the first lateral plate, the second lateral plate and the third lateral plate.

17. The image capturing device as claimed in claim 15, wherein the supporting frame further comprises a plurality of second abutting portions, the second abutting portions are formed on the second lateral plate and the third lateral plate, the second abutting portions abut the second circuit board, and the second circuit board is sandwiched between the second abutting portions and the spacers.

18. The image capturing device as claimed in claim 17, wherein the second abutting portions are formed on the first lateral plate, the second lateral plate and the third lateral plate.

19. The image capturing device as claimed in claim 13, wherein the supporting frame comprises a plurality of hooks, each hook comprises a free end extending toward the housing, the hooks are formed on the second lateral plate and the third lateral plate, the housing comprises a plurality of recesses formed on an inner wall of the housing, each recess comprises a bottom surface, and the free ends of the hooks wedge the bottom surface of the recess.

20. An image capturing device, comprising:
a housing;
a first circuit board, disposed in the housing, wherein the first circuit board comprises an image sensing unit;
a second circuit board, disposed in the housing and coupled to the first circuit board;
a supporting frame, disposed in the housing, wherein at least a portion of the supporting frame surrounds the first circuit board and the second circuit board, the first circuit board and the second circuit board abut the supporting frame, the supporting frame comprises at least one spacer formed thereon, the spacer is sandwiched between the first circuit board and the second circuit board to keep a distance between the first circuit board and the second circuit board, wherein the supporting frame is an elastic member, and the supporting frame comprises:
a plurality of first restriction slots, formed on a side of the spacer;
a plurality of second restriction slots, formed on another side of the spacer, wherein the first circuit board is embedded in the first restriction slot, and the second circuit board is embedded in the second restriction recess;
a base, wherein the image sensing unit is sandwiched between the base and the first circuit board, the base comprises an opening, and the opening exposes at least a portion of the image sensing unit; and
a lens, connected to the housing, and corresponding to the image sensing unit.

* * * * *